United States Patent
Sagryn

[11] Patent Number: 5,979,102
[45] Date of Patent: Nov. 9, 1999

[54] RACK FOR FISHING RODS

[76] Inventor: Edward J. Sagryn, 3844 Butterworth SW., Grand Rapids, Mich. 49504

[21] Appl. No.: 08/829,780

[22] Filed: Mar. 31, 1997

[51] Int. Cl.[6] .................................................. A01K 97/10
[52] U.S. Cl. ........................... 43/21.2; 211/70.8; 114/364
[58] Field of Search ........................... 43/21.2; 211/70.8; 114/364; 224/282, 406, 546, 549, 913, 917.5, 922

[56] References Cited

U.S. PATENT DOCUMENTS

| | | | |
|---|---|---|---|
| D. 300,283 | 3/1989 | Duckro Jr. et al. | D3/38 |
| D. 349,751 | 8/1994 | Ruff | D22/147 |
| 2,578,067 | 12/1951 | Jensen | 224/42.45 |
| 3,291,427 | 12/1966 | Hutchings | 248/201 |
| 3,487,947 | 1/1970 | Bogar, Jr. | 211/60 |
| 3,731,817 | 5/1973 | Fowlkes et al. | 211/60 R |
| 3,876,076 | 4/1975 | Hazelhurst | 211/4 |
| 4,003,612 | 1/1977 | Munsell | 312/245 |
| 4,109,796 | 8/1978 | Mitchell | 211/60 R |
| 4,353,182 | 10/1982 | Junkas et al. | 43/54.5 R |
| 4,424,907 | 1/1984 | Robb | 211/60 R |
| 4,551,939 | 11/1985 | Kitchens | 43/21.2 |
| 4,582,203 | 4/1986 | Davis | 211/70.8 |
| 4,779,914 | 10/1988 | Friedline | 294/143 |
| 4,961,505 | 10/1990 | Moeller | 211/70.8 |
| 5,054,737 | 10/1991 | DeLancey | 248/515 |
| 5,421,495 | 6/1995 | Bubik et al. | 224/42.03 B |
| 5,435,093 | 7/1995 | Minorics et al. | 43/19.2 |
| 5,438,789 | 8/1995 | Emory | 43/21.2 |
| 5,632,112 | 5/1997 | Steinborn | 43/21.2 |
| 5,647,489 | 7/1997 | Bellis, Jr. | 211/70.6 |
| 5,752,638 | 5/1998 | Meeks | 224/547 |

*Primary Examiner*—Michael J. Carone
*Assistant Examiner*—James S. Bergin
*Attorney, Agent, or Firm*—Olson & Hierl, Ltd.

[57] ABSTRACT

A pivotable fishing rod rack including an elongate base member from which extend outwardly one or more elongate arm members that receive and carry a fishing rod or rods. The base member is rotatably received in an anchor that attaches the base member to the gunnel or the deck of a boat. Each arm member has at least one transverse socket for receiving a fishing rod segment. The arm members are in a spaced relationship and substantially parallel to one another, and the respective transverse sockets are aligned so as to receive and carry a fishing rod therebetween. Each anchor includes a clamp for securing an arm member or arm members at a predetermined angle relative to the boat.

14 Claims, 3 Drawing Sheets

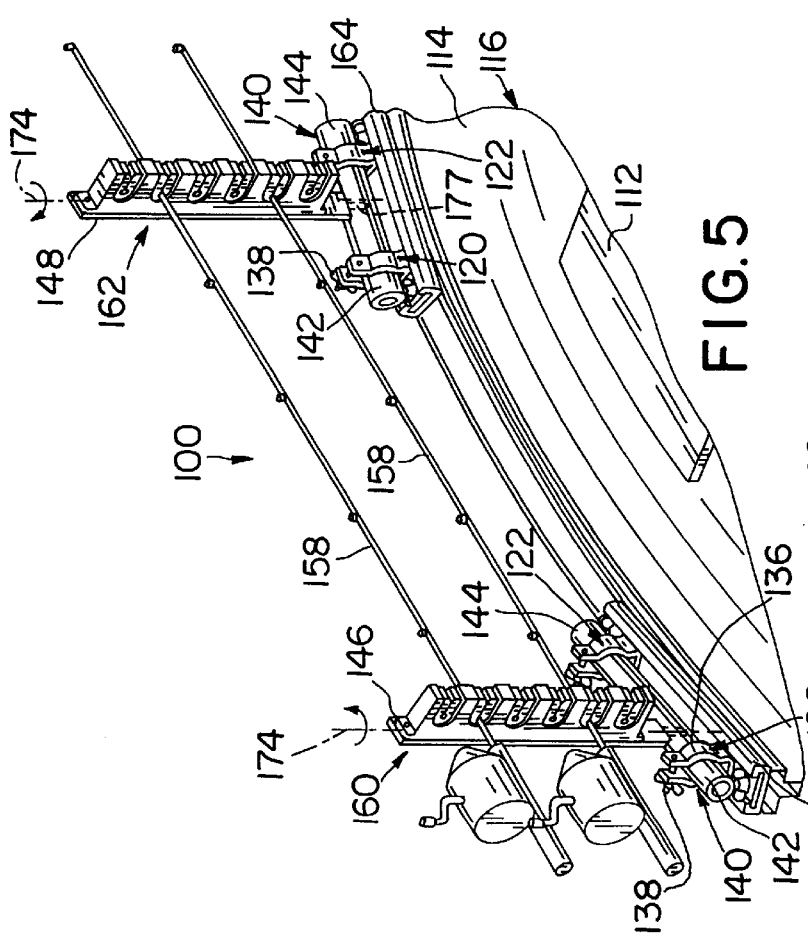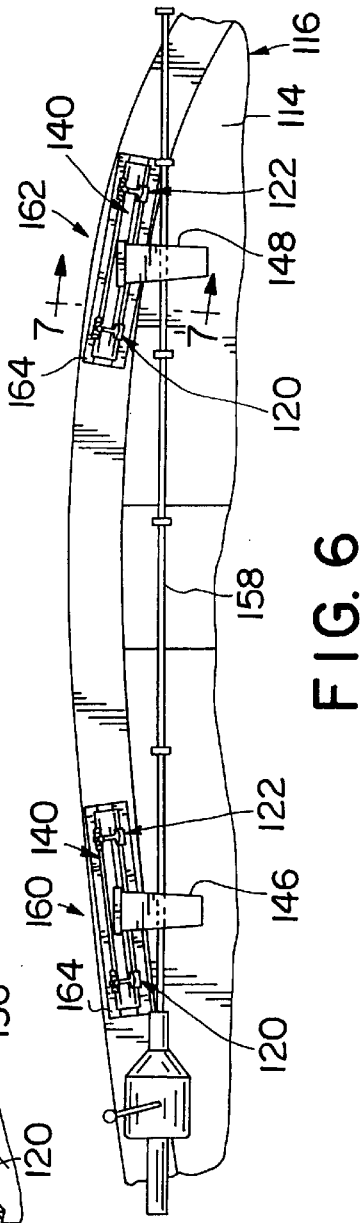

RACK FOR FISHING RODS

TECHNICAL FIELD OF THE INVENTION

This invention relates generally to a fishing rod rack and, more particularly, to a pivotable fishing rod rack adapted to be mounted to a fishing boat.

BACKGROUND OF THE INVENTION

Various racks have been used and are known in the art for holding and storing fishing rods. Examples of such racks are disclosed in U.S. Pat. No. 4,424,907; U.S. Pat. No. 4,109,796; U.S. Pat. No. 3,876,076; and U.S. Pat. No. 3,487,947.

Despite the availability and use of these various racks, there remains a need for a fishing rod rack which can be mounted to the gunnel of a boat and pivoted between a folded position where the fishing rods are stored inside the boat and an extended position where the fishing rods can simply and easily be removed from the rack for use.

SUMMARY OF THE INVENTION

The present invention provides a pivotable rack for fishing rods. The rack is adapted to be secured to a fishing boat.

The pivotable fishing rod rack embodying the present invention includes an elongate base member from which extend outwardly one or more elongate arm members that receive and carry a fishing rod or rods. The elongate base member is rotatably received in an anchor that attaches the base member to a boat, for example, to the gunnel or the deck thereof. Each arm member has at least one transverse socket for receiving a fishing rod segment. When a pair of arm members are affixed to the same elongate base member, the arm members are in a spaced relationship and substantially parallel to one another, and the respective transverse sockets are aligned so as to receive and carry a fishing rod therebetween. Each anchor includes a clamp for securing an arm member or arm members at a predetermined angle relative to the boat, for example, in a fishing rod use position or a fishing rod storage position.

The anchors can be individually mounted to a mounting surface such as the deck or the gunnel or they can be mounted to a plate which is slidably received within a channel member secured to the boat's deck or gunnel. This allows the rack members to be moved longitudinally along the length of the deck or the gunnel so as to adjust the distance between the arm members for accommodating fishing rods of different lengths.

Other features and advantages of the present invention will become readily apparent from the following detailed description, the appended drawings, and the accompanying claims.

BRIEF DESCRIPTION OF THE DRAWINGS

In the drawings:

FIG. 5 is a perspective view of an alternate embodiment of a fishing rod rack according to the present invention;

FIG. 6 is a plan view of the fishing rod rack of FIG. 5; and

FIG. 7 is a broken part vertical cross-sectional view taken along the line 7—7 in FIG. 6.

DESCRIPTION OF THE PREFERRED EMBODIMENTS

Figure 1:
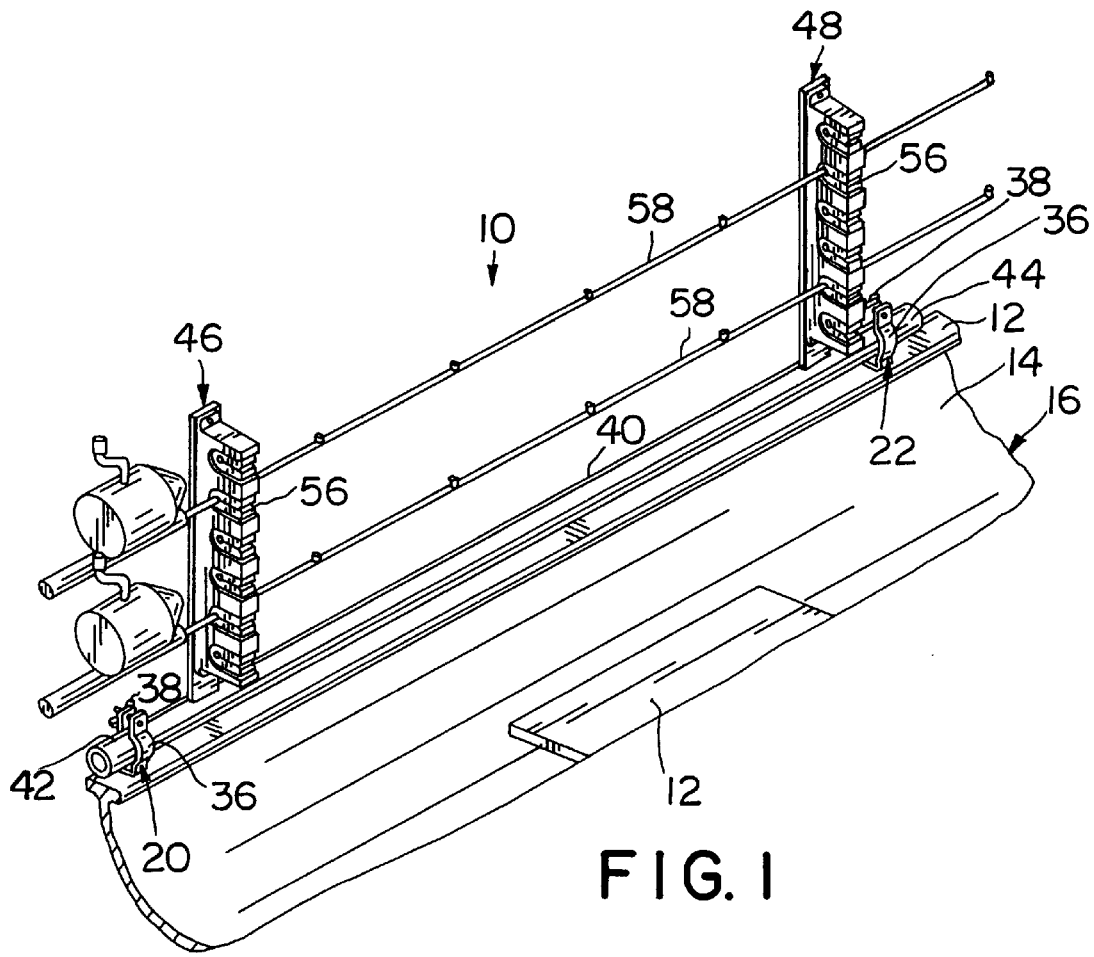
FIG. 1 is a perspective view of a fishing rod rack embodying the principles of the present invention mounted to the gunnel of a boat.

The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

For ease of description, a fishing rod rack embodying the present invention is described hereinbelow in its configuration as shown in the accompanying drawings where the rack is mounted to a horizontal surface of a fishing boat, such as a deck or gunnel, and terms such as upper, lower, horizontal, vertical, etc., will be used herein with reference to this position as shown in the drawings.

The Figures show details of the rack's elements, such as the fishing rod receiving sockets, which are known in the art and that will be recognized by those skilled in the art as such. The detailed descriptions of such elements are not necessary to an understanding of the invention. Accordingly, such elements are herein represented only to the degree necessary to aid an understanding of the features of the present invention.

Figure 2:
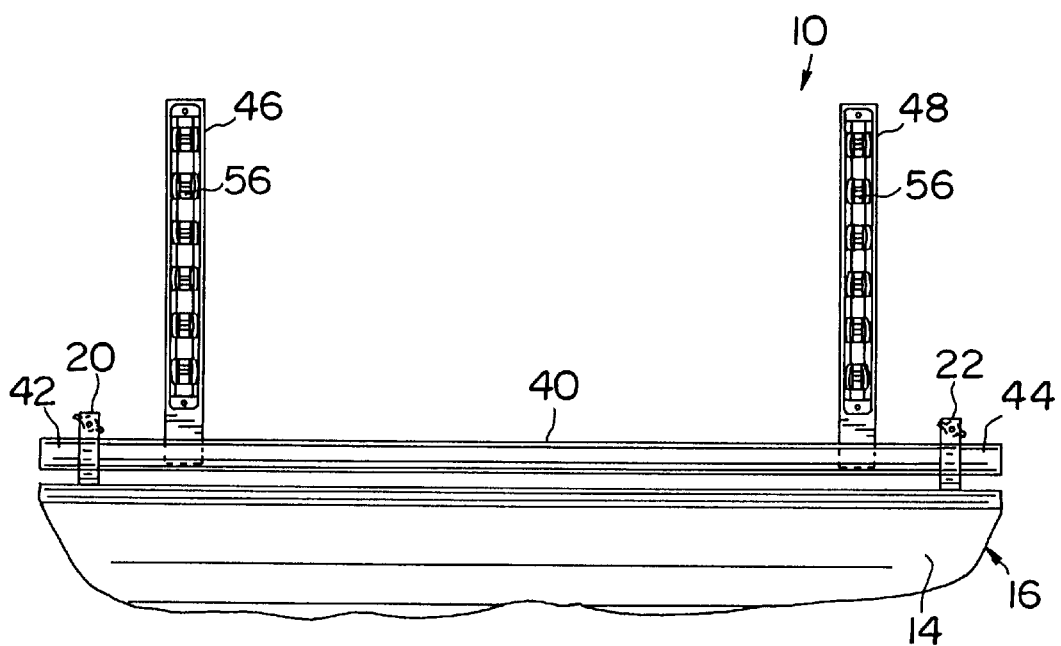
FIG. 2 is a front elevational view of the fishing rod rack of FIG. 1 with the fishing rods removed therefrom and the boat gunnel broken away.

Referring now to the drawings and more particularly, to FIGS. 1 and 2, there is shown therein a pivotable fishing rod rack 10 constructed in accordance with the present invention. Rack 10 is adapted to be mounted to the generally horizontal deck 12 or the gunnel 14 of a boat 16, such as a fishing boat or the like.

It is understood, of course, that the rack 10 of the present invention is likewise mountable to the inside surface of the boat gunnel 14 and further is not limited to use in a boat but rather is mountable to any other suitable support structure such as a work table or wall in a garage or the like.

Figure 3:
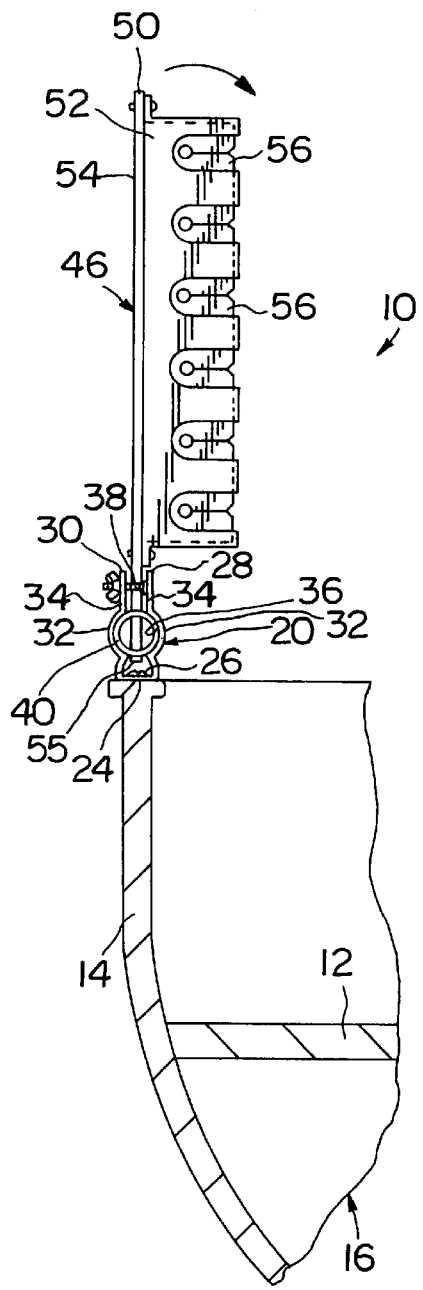
FIG. 3 is a side elevational view of the fishing rod rack in an extended position.

The rack 10 comprises first and second anchors or brackets 20 and 22 secured to the horizontal deck 12 or boat gunnel 14 in spaced-apart and parallel relationship relative to one another. Referring to FIG. 3, each of the anchors 20 and 22 extends generally transversely outwardly from the mounting surface and includes a generally flat bottom plate 24 seated against the mounting surface. A mounting screw 26 extends through the plate 24 and into the gunnel 14 for securing the anchors 20 and 22 and thus the rack 10 to the gunnel 14.

Each of the anchors 20 and 22 further includes two spaced-apart fingers 28 and 30 that form a clamp for an elongate base member 40 which is shown as a hollow tube. Fingers 28 and 30 extend upwardly from the opposite ends of the plate 24 and are in a spaced-apart and parallel relationship to one another. Each of the fingers 28 and 30 includes an outwardly curved portion 32 and a peripheral tip 34 that extends upwardly from the curved portion 32. The curved portions 32 of fingers 28 and 30 are opposed to each other and together define a clamping collar 36. A fastener 38 such as a screw/wing-nut combination passes through the end portions or tips 34 of fingers 28 and 30, respectively, to allow the tightening and loosening of the fingers 28 and 30 and thus the respective clamping collars that hold elongate base member 40.

Base member 40 extends across and is rotatably received by spaced apart anchors 20 and 22. In particular, opposite ends 42 and 44 of base member 40 extend through the collar 36 of anchors 20 and 22 respectively. Base member 40 is rotatable in the collar 36 of anchors 20 and 22, and is spaced from and generally parallel to the mounting surface such as deck 12 or boat gunnel 14.

First and second elongated arm members 46 and 48 are affixed to and extend generally transversely outwardly and away from the base member 40. Arm member 46 is positioned adjacent the end 42 of the base member 40 and the anchor 20. Arm member 48 is positioned adjacent the end 44 of base member 40 and the anchor 22. Arm members 46 and 48 are spaced from one another and generally parallel to one another.

Referring to FIG. 3, arm member 46 comprises a generally flat elongate plate 50 with opposed, generally flat front and back faces 52 and 54 respectively. The front face 52 of arm member 46 is provided with a plurality of transverse rod receiving sockets 56 secured thereto. Sockets 56 extend across face 52 in a parallel and spaced-apart relationship. The bottom end of the arm member 46 extends through an aperture or slot (not shown) in the top surface of base member 40 and into the hollow interior thereof. A pair of fasteners 55 such as screws (only one of which is shown in FIG. 3) extend through the bottom surface of the base member 40, into the hollow interior of the base member 40, and then into the bottom end of the arm member 46 for securing the arm member 46 to the tube 40. Arm member 48 has the same structure as arm member 46.

The structure of each of the sockets 56 is known in the art and is disclosed in, for example, U.S. Pat. No. 3,487,947. The sockets 56 of opposed arm members 46 and 48 are aligned with each other to receive the portions or opposite segments of fishing rods 58 and hold such fishing rods 58 on the rack 10 in a generally transverse relationship to the arm members 46 and 48 and further in a horizontal and parallel relationship to the base member 40.

Figure 4:
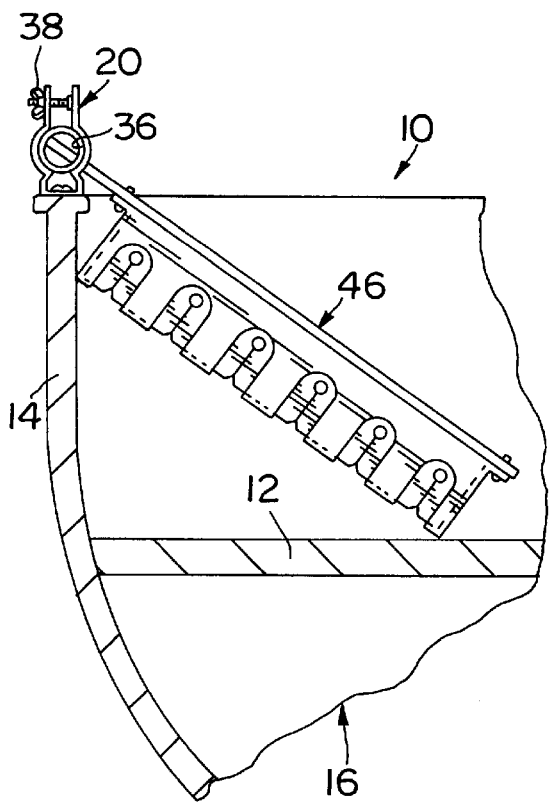
FIG. 4 is a side elevational view of the fishing rod rack in a folded storage position within the boat interior.

The rack 10 and, more particularly, the arm members 46 and 48 thereof, can be secured at a predetermined angle relative to the boat, for example, in a first upwardly extended fishing rod removal or use position (FIGS. 1 and 3), a second fishing rod storage position (FIG. 4), and at in between positions as desired. In the extended position, the arm members 46 and 48 and fishing rods 58 held thereon are positioned so that the fishing rods 58 can be easily and conveniently removed from the rack 10 for use. The fasteners 38 on anchors 20 and 22 are tightened to keep the base member 40 and the arm members 46 and 48 in a locked position. The fasteners 38 are then loosened so that the base member 40 can be rotated and the arm members 46 and 48 pivoted in a clockwise direction and folded into a storage position in the interior of the boat 16.

The rack 10 is particularly suitable for use on a fishing boat or the like where the gunnel 14 is substantially straight along its length.

In an alternative embodiment, shown in FIGS. 5–7, a two piece rack 100 is illustrated. This particular embodiment is suitable for use in a relatively small fishing boat where the gunnel 14 is generally curved along its length.

The rack 100 includes two separate rack members 160 and 162 mounted in a spaced apart relationship to the deck 112 or gunnel 114 of boat 116.

Each of the rack members 160 and 162 includes an elongate channel plate member 164 seated on and mounted to a mounting surface such as the deck 112 or the gunnel 114. As shown in FIG. 7, each of the channel members 164 is generally c-shaped in cross-section and includes opposed inwardly bent flanges 166 and 168 defining an interior longitudinally extending channel 169.

A flat elongate plate 170 is slidingly received in the channel 169 of the channel member 164. Each of the plates 170 includes an adjustable fastener 172 such as wing screw extending therethrough into contact with the interior surface of the respective channel member 164 to lock the plate 170 in place.

Each of the rack members 160 and 162 further includes first and second spaced-apart mounting anchors or brackets 120 and 122 similar in structure to the anchors 20 and 22 of rack 10. However, instead of being mounted directly to the deck 12 or the gunnel 14 as in FIG. 1, the anchors 120 and 122 are mounted in a spaced relationship to the top of the respective plates 170.

An elongate base member 140 in the form of a hollow elongated tube extends across and is rotatably received by the anchors 120 and 122 respectively of each of the rack members 160 and 162. Base member 140 is similar in structure to the base member 40 of rack 10 and, in particular, includes opposite end portions 142 and 144 that extend, respectively, through the collar or clamp 136 of anchors 120 and 122, respectively, of each of the rack members 160 and 162. Each of the base members 140 is rotatable in the collar 136 of anchors 120 and 122, respectively, and is spaced from and generally parallel to the mounting surface such as the deck 112 or boat gunnel 114. Fastener 138, such as a screw and an associate wing nut, secure each base member 140 in a desired position.

An arm member 146 is pivotally affixed to and extends away from the base member 140 of rack member 160. An arm member 148 is pivotally affixed to and extends away from the base member 140 of rack member 162. Arm members 146 and 148 are similar in structure to the arm members 46 and 48 of rack 10. Arm members 146 and 148 differ in structure from arm members 46 and 48 in that the bottom or lower end of each of the arm members 146 and 148 is seated on and abuts the top surface of the respective base member 140 instead of extending through a slot and into the interior of the base member 40 as in the rack 10. As shown in FIG. 7, a fastener 175 such as a screw extends through the bottom surface and the hollow interior of base member 140 and into the bottom end of the respective arm members 146 and 148 so as to allow each of the arm members 146 and 148 to be rotated either clockwise or counterclockwise about their respective longitudinal axis 174 (FIG. 5) relative to the respective base member 140.

Arm members 146 and 148 are also pivotable and foldable into the interior of the boat 110 in the same manner as arm members 46 and 48 of rack 10.

As mentioned above, the two piece rack 100 is particularly suitable for use in smaller and shorter fishing boats where the gunnel 114 is curved substantially along the entire length of the boat.

In the two piece rack 100, each of the arm members 146 and 148 is individually rotatable about a longitudinal axis and relative to its respective base member 140 to allow both arm members 146 and 148 to be positioned parallel to each other notwithstanding the location of the rack members 160 and 162 at different points and angles along the curve of the gunnel 114 or the deck of the boat. This allows the fishing rods 158 to be held on the rack 100 in a generally horizontal and parallel relationship notwithstanding the location of the rack members 160 and 162 along the curve of the gunnel 114. Arm members 146 and 148 can be locked in place by a fastener, if desired. Alternatively, arm members 146 and 148 can be provided with a detent assembly 177 such as a click or the like that facilitates their positioning relative to one another.

The rack 100 is also advantageous in that the distance between arm members 146 and 148 can be varied to accommodate fishing rods of different lengths. This is simply accomplished by loosening the wing nut 172 of the fastener on each of the rack members 160 and 162 and sliding the rack members 160 and 162 away or towards each other along its respective channel member 164 so as to adjust the distance between the spaced apart arm members 146 and 148.

From the foregoing, it will be noted that numerous modifications and variations can be effected with departing from the true spirit and scope of the novel concepts of the present invention. It will be appreciated that the present disclosure is intended as an exemplification of the invention, and is not intended to limit the invention to the specific embodiments illustrated. The disclosure is intended to cover by the appended claims all such modifications as fall within the scope of the claims including, but not limited to, the embodiment where the rack is mounted to the deck of the boat, the interior surface of the gunnel, or embodiments where the rack is mounted to a work bench or a wall in a garage or the like.

I claim:

1. A pivotable rack for a fishing rod which comprises:
    at least one elongate base member;
    at least one anchor for said base member adapted for securement to a boat and rotatably receiving said base member; and
    at least one elongate arm member affixed to and extending away from said base member, and having a transverse socket for receiving a fishing rod segment;
    said anchor including a clamp for securing the arm member at a predetermined angle relative to the boat.

2. The pivotable rack in accordance with claim 1 wherein a pair of elongate arm members are affixed to the base member in a spaced relationship and substantially parallel to one another.

3. The pivotable rack in accordance with claim 1 wherein opposite ends of said base member are rotatably received in a pair of anchors respectively.

4. The pivotable rack in accordance with claim 1 wherein a pair of elongate arm members are respectively affixed to a pair of elongate base members in a spaced and substantially parallel relationship to one another.

5. The pivotable rack in accordance with claim 4 wherein each of said base members is adapted for securement to a boat in a spaced relationship by a pair of anchors respectively which rotatably receive each of said base members respectively.

6. The pivotable rack in accordance with claim 5 wherein each of said pair of anchors is mounted in a spaced relationship to a plate slidingly received within a channel member adapted for securement to a mounting surface of the boat.

7. The pivotable rack in accordance with claim 4 wherein each of said arm members is pivotable about its longitudinal axis relative to the respective base member.

8. A pivotable rack for fishing rods comprising:
    a) first and second anchors adapted for securement to a mounting surface in a boat in spaced-apart and parallel relationship, each of said anchors including a collar;
    b) an elongate base member including opposite ends rotatably received in said collar of said first and second anchors respectively; and
    c) first and second arm members affixed to and extending away from said base member in spaced-apart and parallel relationship, said first and second arm members each including a plurality of transverse sockets for receiving and holding the opposite segments of fishing rods, said first and second arm members being pivotable about said first and second anchors for securing said arm members at a predetermined angle relative to the boat.

9. The pivotable rack in accordance with claim 8 wherein each of said first and second anchors includes a bottom mounting plate adapted for securement to the mounting surface of said boat and a clamp for securing said arm members at a predetermined angle relative to said boat.

10. The pivotable rack in accordance with claim 9 wherein said clamp comprises spaced-apart unitary fingers extending outwardly from the opposite ends of said mounting plate, each of said fingers including an outwardly curved portion, said curved portions of said fingers being opposed from each other to define said collar, each of said fingers further including a tip and a fastener extending through said tip of said fingers for tightening and loosening said clamp.

11. A pivotable rack for fishing rods comprising first and second rack members adapted to be secured to a mounting surface in a boat in a spaced relationship, each of said first and second rack members including:
    a) first and second anchors adapted to be mounted to said mounting surface in a spaced and parallel relationship, each of said first and second anchors including a collar;
    b) an elongate base member including opposed ends rotatably received in said collar of said first and second anchors respectively; and
    c) an arm member affixed to and extending away from said base member and including a plurality of transverse sockets, said arm member being pivotable about said first and second anchors for securing said arm member at a predetermined angle relative to the boat, said arm member of said first rack member being spaced from and parallel to said arm member of said second rack member, said fishing rods capable of being received and held in said sockets of said spaced arm members.

12. The pivotable rack in accordance with claim 11 wherein said first and second anchors of each of said first and second rack members are mounted to a plate which is slidingly received within a channel member adapted for securement to the mounting surface of the boat.

13. The pivotable rack in accordance with claim 11 wherein each said elongate base member is hollow and further includes fastening means extending therethrough and into said respective arm member affixed thereto so as to allow the pivoting of said arm member about the longitudinal axis thereof relative to said respective base member.

14. The pivotable rack in accordance with claim 11 wherein each of said first and second anchors includes a mounting plate adapted for securement to the mounting surface of the boat and a clamp comprising spaced unitary fingers extending outwardly from the opposite ends of said mounting plate, each of said fingers including an outwardly curved portion, said curved portions of said fingers being opposed from each other to define said collar, each of said fingers further including a tip, each of said anchors further including fastening means extending through said tip of said fingers for tightening and loosening said clamp.

* * * * *